(12) United States Patent
Hodgins

(10) Patent No.: US 6,264,013 B1
(45) Date of Patent: Jul. 24, 2001

(54) PIVOT CONNECTION FOR A GRAPPLE

(75) Inventor: J. Kevin Hodgins, Prince George (CA)

(73) Assignee: Canada Incorporated, Prince George (CA)

(*) Notice: Subject to any disclaimer, the term of this patent is extended or adjusted under 35 U.S.C. 154(b) by 0 days.

(21) Appl. No.: 09/206,227

(22) Filed: Dec. 7, 1998

(51) Int. Cl.⁷ ................................................ F16D 55/08
(52) U.S. Cl. ........................................................ 188/83
(58) Field of Search .............................. 188/83, 381, 134, 188/136, 166, 70 R

(56) References Cited

U.S. PATENT DOCUMENTS

| | | | |
|---|---|---|---|
| 3,009,747 | * 11/1961 | Pitzer | 384/272 |
| 4,572,567 | * 2/1986 | Johnson | 294/119.4 |
| 4,573,728 | * 3/1986 | Johnson | 294/119.4 |
| 5,096,247 | * 3/1992 | Killen | 294/119.4 |
| 5,451,087 | * 9/1995 | Beaulieu | 294/119.4 |
| 5,713,688 | * 2/1998 | McCallum | 403/57 |
| 5,779,383 | * 7/1998 | McCallum | 403/57 |

FOREIGN PATENT DOCUMENTS

| | | | |
|---|---|---|---|
| 1470500 | * 3/1966 | (FR) | 188/70 R |
| 1498491 | * 7/1966 | (FR) | 188/70 R |
| 864472 | * 4/1961 | (GB) | 188/70 R |

\* cited by examiner

*Primary Examiner*—Douglas C. Butler
*Assistant Examiner*—Melody M. Burch
(74) *Attorney, Agent, or Firm*—Swabey Ogilvy Renault

(57) ABSTRACT

A pivot connection for a grapple having a link member with a journal-bore at one end, a yoke member with spaced-apart parallel arms receiving the one end of the link member therebetween bores in the arms, and a pivot pin mounted through the bores in the arms in the yoke member and the journal-bore in the link member to pivotally connect the two members together. Tapered, counter-bored brake surfaces are provided in each side of the link member concentric with the journal-bore. Tapered brake cores are slidably mounted on the pivot pin and located in the counter-bores facing each other, each core located between an arm of the yoke and the link member, in such a way that the break cores are not load bearing structures in the pivot connection. A mechanical connection applies pressure to one of the cores to force both cores against the brake surfaces to brake the link member relative to the yoke member.

10 Claims, 3 Drawing Sheets

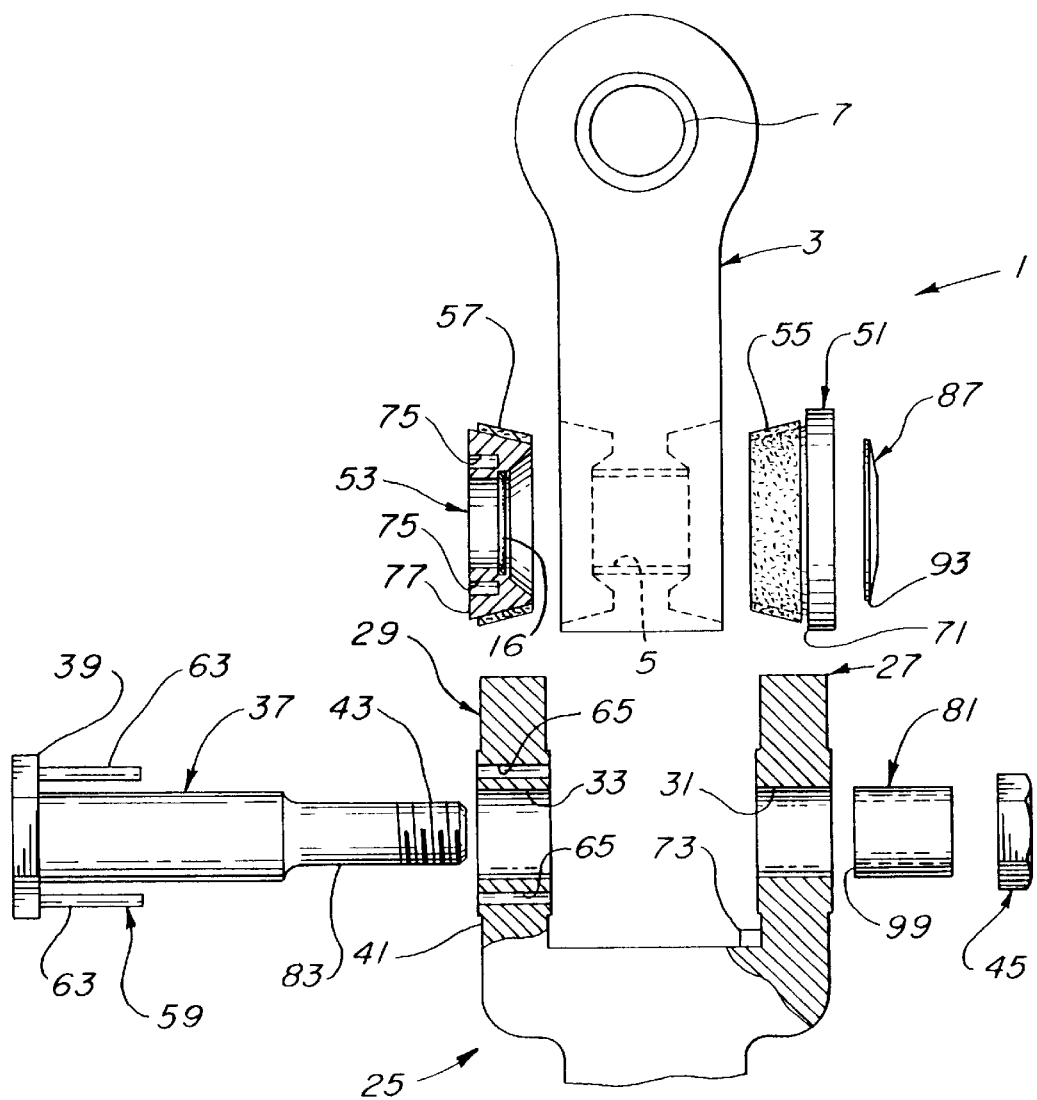
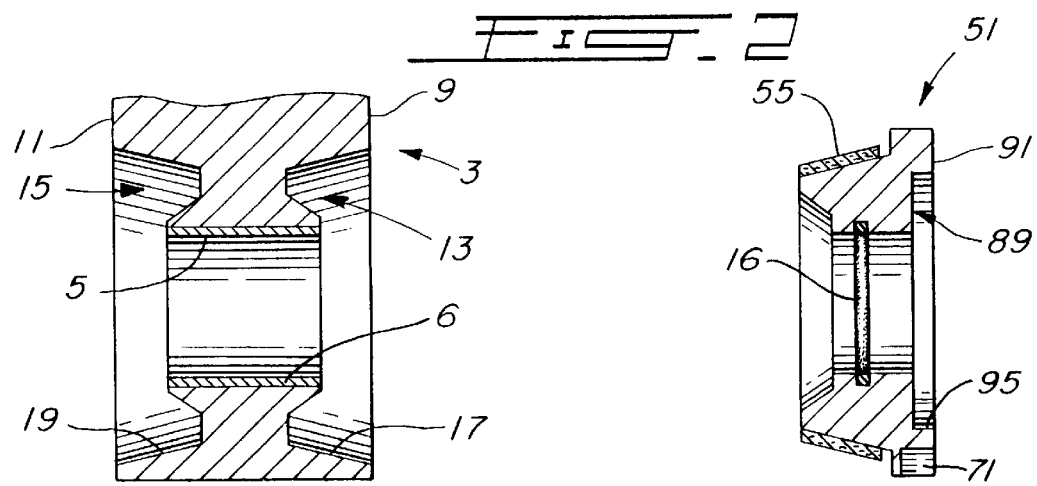

PIVOT CONNECTION FOR A GRAPPLE

BACKGROUND OF THE INVENTION

1. Field of the Invention

This invention is directed toward an improved, snubbed, pivot connection.

2. Description of the Prior Art

Grapples are employed in loading or skidding logs in the forest industry. The grapple has a pair of grapple arms pivotally suspended from the end of a boom, the arms operable to grapple or grab a load of logs. The pivot connection connecting the grapple arms to the boom comprises two pivots, with the axis of the two pivots at right angles to each other to permit universal movement of the grapple arms. To prevent the grapple arms from swinging uncontrollably about the pivots, which swinging could cause damage and/or injury, and which causes excessive wear on the pivots, dampers or snubbers are provided in the pivots to dampen the swinging movement.

Each pivot usually employs a link member pivotally connected by a pivot pin between the arms of a yoke member. The snubber employed is usually a dual snubber having a pair of opposed brake means in the pivot to balance the braking load and reduce wear. Examples of such dual snubbers are shown in U.S. Pat. No. 4,572,567, Johnson, issued Feb. 25, 1986, and in U.S. Pat. No. 4,573,728, Johnson, issued Mar. 4, 1986, by way of example. These dual snubbers are usually operated by hydraulic means. The use of fluid to actuate the brake means in the dual snubber presents a problem in that the fluid leaks. Leakage of fluid changes the braking effect. In addition, the hydraulic actuating means employed in these dual snubbers are often complicated in construction and thus expensive. The known dual snubbers also have wear problems due to the type of brake means employed. Brake disks, as employed in U.S. Pat. No. 4,573,728, for example, wear unevenly because it is difficult to apply pressure uniformly. Often the brakes are quite small, as in U.S. Pat. No. 4,572,567, for example, and thus tend to wear out quite quickly because of the load applied.

It is known to provide snubbers that are mechanically rather than hydraulically operated. These single snubbers employ a tapered brake sleeve in the brake means cooperating with a tapered braking surface. These brake means increase the braking efficiency because of their size, and being self-centering, braking force is applied more evenly, thus reducing wear of the brake means. The tapered brake sleeve, being operated mechanically rather than hydraulically, ensures that the braking force remains more constant. Examples of such snubbers are shown in U.S. Pat. No. 5,451,087, Beaulieu, issued Sep. 19, 1995. However, these single snubbers do not provide balanced braking and thus have excessive wear. In addition, the adjustment means employed to control their braking force are still quite complicated and thus expensive. Further, the single snubbers require enlarged yokes to be properly used in some embodiments, and in other embodiments, the single snubbers are exposed to damage.

Other examples of double mechanically operated snubbers are found in U.S. Pat. No. issued Feb. 3, 1998. These double snubbers are an integral part of the load bearing structure at the pivot connection and subject to uneven wear of the breaking surfaces leading to a reduced dampening ability of the snubber.

SUMMARY OF THE INVENTION

It is the purpose of the present invention to provide a dual snubber for a pivot connection, employing a link member within a yoke member, which dual snubber is mechanically operated in a simple and easy manner.

It is another purpose of the present invention to provide a mechanically operated dual snubber in which the braking force is easily adjusted.

It is another purpose of the present invention to provide a dual snubber employing tapered brake cores which are mounted in a compact manner in a protected environment.

It is another purpose of the present invention to provide a dual snubber for a pivot connection, wherein the load is not borne by the brake cores.

In accordance with the present invention, there is provided a pivot connection having a pivot pin member between the arms of a yoke member and a link member having a journal-portion journalled on the pivot pin between the arms of the yoke member. Tapered brake cores are provided adjacent each side of the journal-portion of the link member, mounted for axial sliding movement on the pivot pin. Recesses are provided on each side of the journal portion of the link for receiving the respective brake cores. The recesses define conical brake surfaces to be contacted by the brake cores. The recesses in the link member for receiving the cores provide a compact mounting for the cores and also protect the cores.

The improved pivot connection also includes mechanical means on the pivot pin at one end of the pin for biasing the brake core adjacent the one end into contact with the link member, which biasing action simultaneously biases the other brake core into contact with the other side of the link member. The braking force is easily adjusted by the mechanical means and remains the same, once set, except for wear of the brake surfaces. The location of the mechanical means provides easy access for adjustment of the braking force.

The invention is particularly directed toward a pivot connection having a link member with a journal-bore at one end, a yoke member with spaced-apart parallel arms receiving the one end of the link member therebetween, bores in the arms, and a pivot pin mounted through the bores in the arms in the yoke member and the journal-bore in the link member to pivotally connect the two members together. Tapered, counter-bored brake surfaces are provided in each side of the link member concentric with the journal-bore. Tapered brake sleeves are slidably mounted on the pin and located in the counter-bores facing each other, each core located between an arm of the yoke and the link member. A nut, threaded on the end of the pin outside the yoke, applies axial pressure through a mechanical connection to one of the cores to force both cores against the brake surfaces to brake the link member relative to the yoke member.

BRIEF DESCRIPTION OF THE DRAWINGS

The invention will be better understood by an examination of the following description, together with the accompanying drawings, in which:

FIG. 2 is a front exploded view, in partial cross-section, of the pivot connection;

FIG. 3 is a partial cross-sectional view of the link member used in the pivot connection;

FIG. 4 is a cross-sectional view of one of the brake cores; and

DESCRIPTION OF THE PREFERRED EMBODIMENTS

Figure 1:
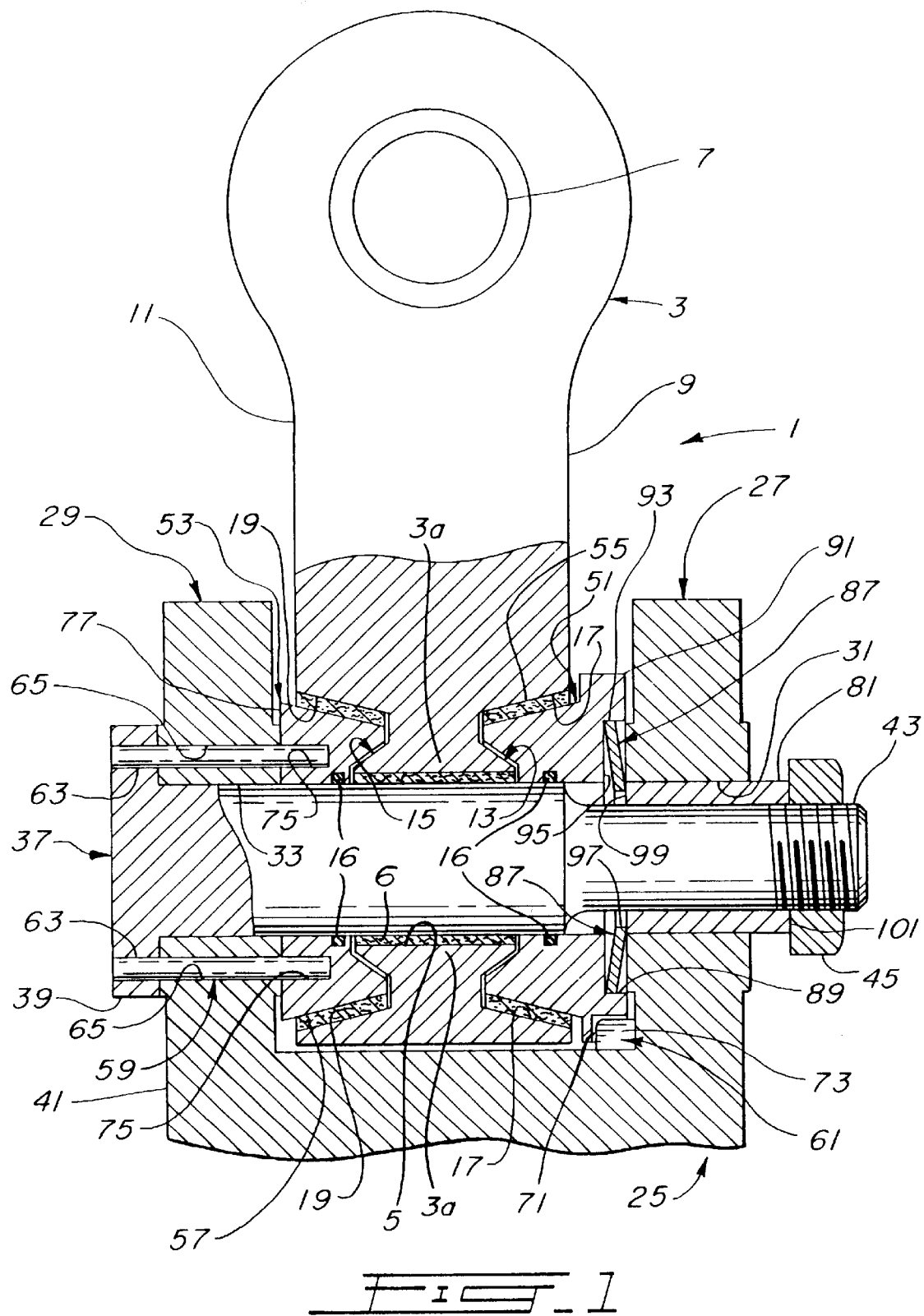
FIG. 1 is a cross-sectional view of the pivot connection according to an embodiment of the present invention.

According to an embodiment of the present invention, the pivot connection 1, as shown in FIGS. 1, 2 and 3, has a link member 3 having a journal-bore 5 in its lower portion 3a that is transverse to an upper pivot opening on the upper portion of the member. The upper pivot bore 7 can be used to rotatably mount the link member 3 on the end of a boom (not shown), or to another pivot connection (not shown). The sides 9, 11 of the link member 3, which are transverse to the axis of the journal-bore 5, have tapered, countersunk recesses 13, 15 concentric with the journal-bore 5. The opposed recesses 13, 15 each define tapered brake surfaces 17, 19 within the link member 3.

The pivot connection 1 includes a bottom yoke member 25 having a pair of parallel arms 27, 29 with aligned pivot bores 31, 33 defined coaxially through the arms 27, 29. The lower journal-portion of link member 3 fits between the arms 27, 29 and a pivot pin 37 passes through the aligned bores 5, 31, 33. The mechanical connection between pivot pin 37 and the journal-bore 5 is made through a replaceable wear bushing 6. The pivot pin 37 has a head 39 on one end that abuts one side 41 of the arm 29, and the other end is threaded as shown at 43. A nut 45 is threaded on the threaded end of the pin 37 to retain it in place.

Brake means are provided on the pin 37 for cooperating with the brake surfaces 17, 19 on the link member 3. The brake means comprise a pair of tapered brake cores 51, 53 slidably mounted on the pin 37 with one core 51 located between arm 27 and the link member 3 and the other core 53 located between the other arm 29 and the link member 3. Each core 51, 53 is provided with an outer conical friction sleeve 55, 57 respectively. The cores 51, 53 are sized to fit snugly within the tapered brake surfaces 17, 19 in the link member 3.

Means are provided for fixing the brake cores 51, 53 against rotation relative to the pin 37 and yoke 25. O-rings 16 are provided to seal the cores 51, 53 to the pin 37. The rotation preventing means can comprise first rotation preventing means 59 for preventing rotation of the pivot pin 37 relative to the yoke member 25 and brake core 53 relative to pin 37; and second rotation preventing means 61 for preventing rotation of the brake core 51 relative to the yoke member 25. The first rotation preventing means 59 can comprise a set of pins 63 (two shown) that project from the head 39 of the pin 37, parallel to the axis of the pin 37, through holes 65 in arm 29 of the yoke member 25. As shown, the rotation preventing means for core 53 is accomplished by pins 63 which extend through holes 65 of arm 29 into blind holes 75 formed in the outer side 77 of core 53. The second rotation preventing means 61 can comprise a slot 71 (only one shown) provided on the outer periphery of the brake core 51. The stop tab 73 (only one shown) is part of the yoke member 25 adjacent the base of arm 27.

Mechanical means are provided for forcing the brake cores 51, 53 against the brake surfaces 17, 19 and to provide brake movement of the link member 3 relative to the yoke member 25. The mechanical brake applying means has a thrust sleeve 81 mounted on the pivot pin 37 at its threaded end 43. The threaded end 43 of the pivot pin 37 can be reduced in diameter, as shown at 83, to receive the sleeve 81. The sleeve 81 fits snugly between the pin 37 and the arm 27 in the bore 31 and is slidable on the reduced diameter portion 83 of the pin 37. The mechanical brake applying means includes a Belleville-type spring washer 87 and the nut 45. The washer 87 is mounted within a shallow counter-bore 89 on the outer face 91 of the brake core 51 with the outer peripheral edge 93 of the washer 87 bearing against the inner surface 95 of the counter bore 89 and the inner peripheral edge 97 of the washer 87 bearing against the inner end 99 of the sleeve 81. The nut 45 on the pin 37 bears against the outer end 101 of the sleeve 81.

When the nut 45 is tightened on the pin 37, it pushes the sleeve 81 against the washer 87, the washer 87 resiliently biasing the brake core 51 against the brake surface 17. This tends to push the link member 3 to the side, as seen in FIG. 1. However, this causes the brake core 53 on the other side to be also biased against its brake surface 19 on the other side of the link member 3 since the core is prevented from moving to the side by the arm 29 of the yoke member 25. Thus, braking is provided equally from both brake cores 51, 53. The braking force is controlled by the position of the nut 45 on the threaded end of the pivot pin 37.

According to another embodiment (not shown), the rotation preventing means for both cores 51 and 53 can comprise slots 71 and stop tabs 73.

Figure 5:
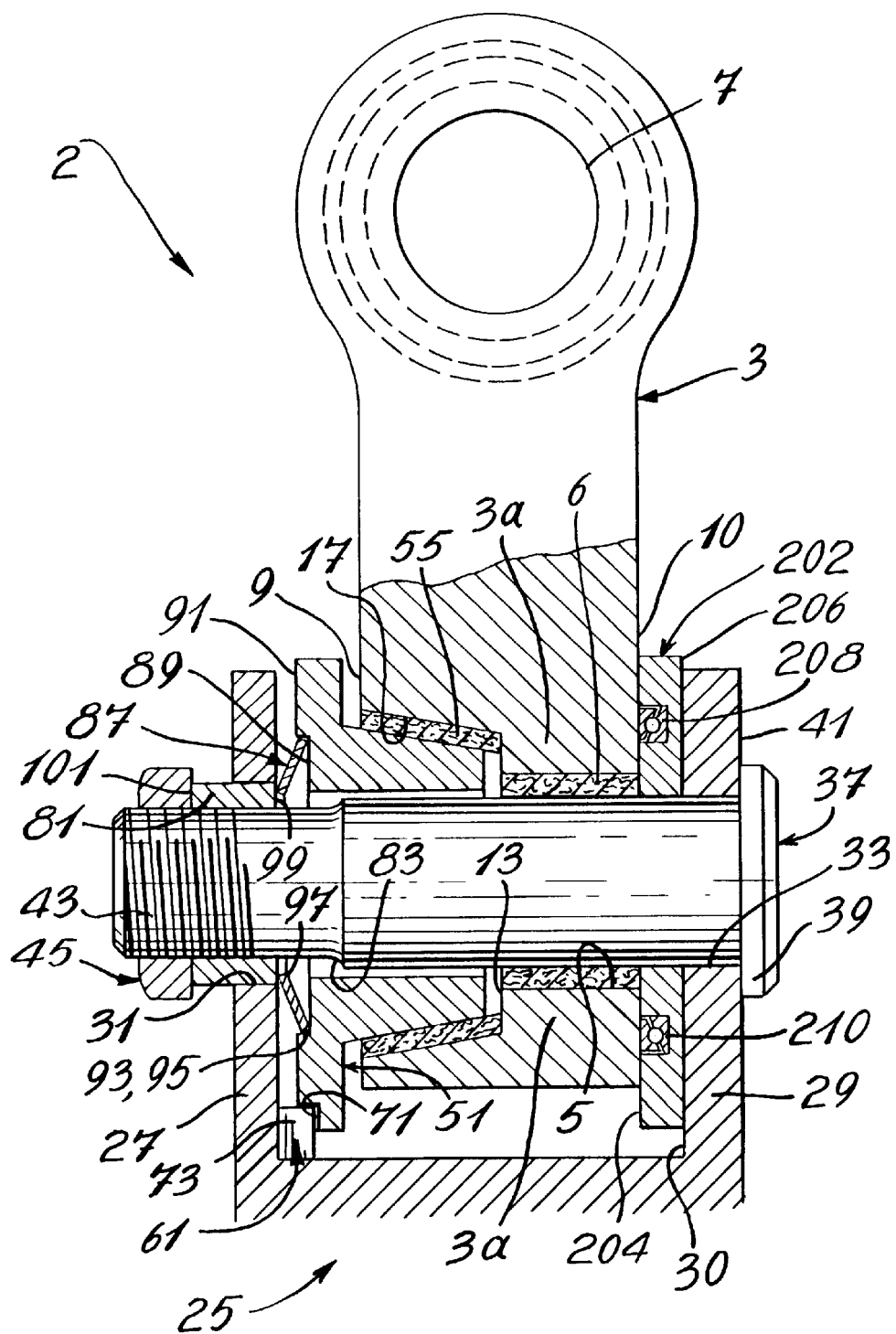
FIG. 5 is a cross-sectional view of the pivot connection according to another embodiment of the present invention.

According to yet another embodiment of the present invention as shown in FIG. 5, a pivot connection 2 has a link member 3 having a journal-bore 5 in its lower portion 3a, that is transverse to an upper pivot opening 7 on the upper portion of the link member 3. Side 9 of the link member 3 has a tapered, countersunk recess 13 concentric with the journal-bore 5. The recess 13 defines a tapered brake surface 17 within the link member 3.

The pivot connection 2 includes a bottom yoke member 25 having a pair of parallel arms 27, 29 with aligned pivot bores 31, 33 defined coaxially through the arms 27, 29. The lower journal-portion of link member 3 fits between the arms 27, 29, and a pivot pin 37 passes through the aligned bores 5, 31, and 33. The pivot pin 37 has a head 39 on one end that abuts one side 41 of the arm 29. The other end of the pin 37 is threaded as shown at 43. A nut 45 is threaded on the threaded end of the pin 37 to retain it in place.

Brake means are provided on the pin 37 for cooperating with the brake surfaces 17 on the link member 3. The brake means comprise a tapered brake core 51 slidably mounted on the pin 37 with the core 51 located between arm 27 and the link member 3. The core 51 is provided with an outer conical friction sleeve 55. The core 51 is sized to fit snugly within the recessed, tapered brake surface 17 in the link member 3.

Means are provided for fixing the brake core 51 against rotation relative to yoke 25 shown at 61. The rotation preventing means 61 comprise a slot 71 (only one shown) provided on the outer periphery of the brake core 51, and a stop tab 73 (only one shown) is part of the yoke member 25 adjacent the base of arm 27.

Mechanical brake-applying means are provided for forcing the brake core 51 against the brake surfaces 17 and to provide snubbing effect of the link member 3 relative to the yoke member 25. The mechanical brake-applying means includes a thrust sleeve 81 mounted on the pivot pin 37 at its threaded end 43. The threaded end 43 of the pivot pin 37 can be reduced in diameter, as shown at 83, to receive the sleeve 81. The sleeve 81 fits snugly between the pin 37 and the arm 27 in the bore 31 and is slidable on the reduced diameter portion 83 of the pin 37. The mechanical brake-applying means includes a Belleville-type spring washer 87 and the nut 45. The washer 87 is mounted within a shallow counter-bore 89 on the outer face 91 of the brake core 51 with the outer peripheral edge 93 of the washer 87 bearing against the inner surface 95 of the counter-bore 89 and the inner peripheral edge 97 of the washer 87 bearing against the inner end 99 of the sleeve 81. The nut 45 on the pin 37 bears against the outer end 101 of the sleeve 81.

According to this embodiment, when the nut 45 is tightened on the pin 37, it pushes the sleeve 81 against the washer 87, whereby the washer 87 resiliently biases the brake core 51 against the brake surface 17. This tends to push the link member 3 to the side, as seen in FIG. 5. However, this causes a pressure plate 202 on the other side of the link member 3 to be also biased against side 10 of the link member 3 since side 206 of pressure plate 202 abuts against the arm 29 of the yoke member 25. Side 204 of pressure plate 202 has a countersunk groove 208 in which thrust bearing 210 is positioned to provide frictionless contact between side 10 of link member 3 and side 204 of pressure plate 202. Braking is provided by brake core 51. The braking force is controlled by the position of the nut 45 on the threaded end of the pivot pin 37.

The contact surface between the friction sleeve 55 on the brake core 51 and the brake surface 17 can be greased, if desired, to increase the life of the brake means. Alternatively, the friction sleeves and the brake surfaces can be made from composite materials which increase the life of the contact surfaces.

It is noted that link 3 includes a relatively broad central portion 3a, journalled directly to the pin 37, in order that the load of the grapple is transferred directly from the yoke arms through the pin 37 and to the link 3. This avoids undue wear on the brake core 51 and friction sleeve 17.

The described arrangement provides a compact, yet effective, single acting snubber on a grapple. The mechanical operation of the snubber is simple and easy as is adjustment of the braking force.

I claim:

1. A pivot connection having a link member with a journal-bore at one end; a yoke member with spaced-apart parallel arms receiving the one end of the link member therebetween, the parallel arms defining coaxially aligned bores in the arms; a pivot pin mounted through the bores in the arms in the yoke member and the journal-bore in the link member to pivotally connect the two members together characterized in that the link member and the yoke member each have load bearing portions on the pivot pin; tapered, counter-bored brake surfaces are defined in each side of the link member concentric with the journal-bore; and tapered brake cores are slidably mounted on the pivot pin and located at the counter-bored brake surfaces, each brake core located between a respective arm of the yoke and the load bearing of the one end of the link member journalled on the pivot pin, thereby providing dampening movement of the pivot movement between the link member and the yoke member wherein load bearing portions of the yoke member include the yoke arms on the pivot pin and the load bearing portion of the link member includes the one end of the link journalled on the pivot pin as distinct from the brake cores forming the movement dampening means; and means for preventing rotation of the brake cores and the pivot pin relative to the yoke member.

2. The pivot connection as claimed in claim 1, wherein the one end of the link journalled on the pivot pin includes a bushing sleeve within the journal bore on the pivot pin.

3. The pivot connection as claimed in claim 1, including a mechanical connection to apply pressure to one of the brake cores to force both brake cores against the brake surfaces to brake the link member relative to the yoke member.

4. The pivot connection as claimed in claim 3, wherein the mechanical connection comprises a nut, the nut threaded on a threaded end of the pivot pin outside the yoke, a sleeve slidable on the pivot pin and concentric with one of the yoke arms, a spring washer on the pivot pin between one end of the sleeve and one of the brake cores, the nut adjacent the other end of the sleeve, whereby tightening the nut on the pivot pin causes it to push the sleeve and thus the washer against the one of the brake cores to apply a braking force.

5. The pivot connection as claimed in claim 1, wherein the means for preventing rotation of one of the brake cores relative to the yoke includes a head on the pivot pin adjacent one of the arms of the yoke member, and pin members extending from the head through bores formed in the arm of the yoke member and into blind holes in the brake core.

6. The pivot connection as claimed in claim 4, wherein the means preventing rotation of the brake cores relative to the yoke includes cooperating stop means on the brake cores and yoke member.

7. The pivot connection as claimed in claim 5, wherein the means preventing rotation of the brake cores relative to the yoke includes cooperating stop means on the other of the brake cores and yoke member, the pin members on the pivot pin extending into the one of the brake cores.

8. The pivot connection as claimed in claim 4, wherein the means for preventing rotation of the brake cores relative to the yoke includes a head on the pivot pin adjacent one of the arms of the yoke member, and pin members extending from the head through holes formed in the arm of the yoke member into blind holes in the other of the brake cores.

9. The pivot connection as claimed in claim 8, wherein the means preventing rotation of the brake cores relative to the brake surfaces includes cooperating stop means on the one of the brake cores and the respective yoke arm.

10. The pivot connection as defined in claim 1, wherein a bushing sleeve is included within the journal-bore of the link member on the pivot pin.

\* \* \* \* \*

UNITED STATES PATENT AND TRADEMARK OFFICE
CERTIFICATE OF CORRECTION

PATENT NO.     : 6,264,013 B1
DATED          : July 24, 2001
INVENTOR(S)    : J. Kevin Hodgins Page 1 of 1

It is certified that error appears in the above-identified patent and that said Letters Patent is hereby corrected as shown below:

<u>Title page,</u>
Item [73], Assignee, should read -- 3296393 CANADA INCORPORATED --.

Signed and Sealed this

Second Day of April, 2002

Attest:

Attesting Officer

JAMES E. ROGAN
Director of the United States Patent and Trademark Office